United States Patent [19]

Terada et al.

[11] Patent Number: 5,698,165
[45] Date of Patent: Dec. 16, 1997

[54] OZONE FILTER AND PROCESS FOR PRODUCING THE SAME

[75] Inventors: Isao Terada; Shinichiro Arai, both of Kanagawa, Japan

[73] Assignee: Nichias Corporation, Tokyo, Japan

[21] Appl. No.: 519,097

[22] Filed: Aug. 24, 1995

[30] Foreign Application Priority Data

Aug. 31, 1994 [JP] Japan .............. HEI. 6-229060
Oct. 31, 1994 [JP] Japan .............. HEI. 6-288667

[51] Int. Cl.$^6$ .............. A61L 9/00; B01J 29/076; B01J 23/34
[52] U.S. Cl. .............. 422/122; 55/524; 55/527; 55/DIG. 5; 423/219; 502/64; 502/87; 502/324
[58] Field of Search .............. 422/122; 502/64, 502/87, 324, 415, 439; 423/700, 219, 581; 55/524, 527, DIG. 5

[56] References Cited

U.S. PATENT DOCUMENTS

| 4,407,728 | 10/1983 | Ball et al. ............. 502/60 |
| 5,262,129 | 11/1993 | Terada et al. ............. 422/122 |
| 5,417,950 | 5/1995 | Sheu et al. ............. 95/128 X |

FOREIGN PATENT DOCUMENTS

C4-027992  1/1992  Japan .
2258622  2/1993  United Kingdom .

OTHER PUBLICATIONS

WPI Abstract Accession No. 88–052620/08 & JP 630007844 A (Kubota) Jan. 13, 1988.

WIP Abstract Accession No. 92–061461/08 & JP040007038 A (CATALER) Jan. 10, 1992.

*Primary Examiner*—Robert J. Warden
*Assistant Examiner*—E. Leigh Dawson
*Attorney, Agent, or Firm*—Cushman Darby & Cushman IP Group of Pillsbury Madison & Sutro, LLP

[57] ABSTRACT

An ozone filter comprising a paper carrier made of inorganic fiber and having a high porosity is disclosed. Supported by the carrier is a zeolite powder having an $SiO_2/Al_2O_3$ molar ratio of not smaller than 15 and fine powder-like activated manganese dioxide having ozone decomposing capability. A process for producing the ozone filter is also disclosed. The ozone filter does not give off a foul smell even when used for a long period of time.

10 Claims, No Drawings

OZONE FILTER AND PROCESS FOR PRODUCING THE SAME

FIELD OF THE INVENTION

This invention relates to an ozone filter comprising fine powder-like activated manganese dioxide (hereinafter referred to as a manganese dioxide catalyst) capable of decomposing ozone and a process for producing the same.

BACKGROUND OF THE INVENTION

Ozone exerts both beneficial and harmful effect on human beings. For example, the bactericidal action of ozone based on its powerful oxidizing ability has found wide use in the medical field, the food field, etc. On the other hand, ozone gives a perceptible stimulus to respiratory organs when present in air at a concentration exceeding 0.1 ppm and presents a potentially fatal danger at a concentration exceeding 50 ppm. Because the number of sources of ozone generation have been increasing with the recent spread of ozone-generating office automation equipment, such as electrostatic copying machines and laser printers, there has been a greater demand to develop an easy method for decomposing ozone in air.

Conventional techniques for making low concentration ozone in air harmless include an activated carbon adsorption method, a thermal decomposition method, a wet method, and a catalytic decomposition method. The catalytic decomposition method is advantageous in that it is highly safe and can be carried out with ease at ordinary temperatures and on a small scale. One example of such an ozone filter that made it feasible to carry out catalytic decomposition of ozone with ease and on a small scale is described in JP-A-5-23591 (the term "JP-A" as used herein means an "unexamined published Japanese patent application"). This ozone filter comprises a honeycomb carrier made of paper having a high porosity having carried thereon a manganese dioxide catalyst.

The ozone filter using a manganese dioxide catalyst is characterized by its long-lasting high ozone decomposing capability. Although rare, cases have been reported in which long use of the filter results in emission of an offensive smell while the filter still has normal ozone decomposing capability.

The inventors of the present invention examined an ozone filter having an offensive smell as a result of long-term use and found that a number of organic compounds had been adsorbed onto the filter. The identified organic compounds mainly include acetone, 2-propanol, t-butanol, methyl ethyl ketone, lower fatty acids, chloroform, toluene, butyl acetate, ethylbenzene, xylene, butyl ethyl ketone, styrene, α-methylstyrene, o-xylene, acetophenone, t-butyl phenyl ether, and dimethylbiphenyl. It was noted that these compounds were not adsorbed (or were adsorbed at very small concentrations) on an ozone filter before operation; therefore, it was concluded that they were adsorbed by manganese dioxide during operation of the filter.

The reason why compounds that hardly exist in the air of an ordinary environment are adsorbed onto an ozone filter is probably as follows. Air contains traces of organic matter originated in organic substances released from humans, animals and plants, such as sweat, smoke of tobacco, and perfume, and the organic matter passes through an ozone filter. Traces of organic substances originated in those released from equipment to which an ozone filter is fitted during operation, such as a toner and a machine oil, also pass through the ozone filter. Part of the organic matter coming into contact with an ozone filter is adsorbed by the manganese dioxide catalyst either as such or after oxidation or decomposition in the presence of the ozone and the manganese dioxide catalyst and accumulated thereon.

However smelly these organic substances may be, they give rise to no problem insofar as they are adsorbed by the manganese dioxide catalyst. However, once the adsorptivity of the manganese dioxide catalyst reaches saturation after long-term use, the organic substances are released into the air together with the treated air, and some of them seem to be combined to give off a foul smell.

SUMMARY OF THE INVENTION

An object of the present invention is to provide an improved ozone filter containing a manganese dioxide catalyst exhibiting excellent ozone decomposing capability, which does not give off a foul smell even after long-term use.

The above object is accomplished by fixing fine powder-like activated manganese dioxide together with zeolite powder having an $SiO_2/Al_2O_3$ molar ratio of not smaller than 15 on a paper carrier made of inorganic fiber and having a high porosity.

The present invention provides an ozone filter comprising a paper carrier made of inorganic fiber and having a high porosity having supported thereon zeolite powder having an $SiO_2/Al_2O_3$ molar ratio of not smaller than 15 and a manganese dioxide catalyst.

In a preferred embodiment of the ozone filter according to the present invention, the zeolite powder is present at a higher density in the core portion than in the surface portion of the carrier, and the manganese dioxide catalyst is present at a higher density in the surface portion than in the core portion of the carrier.

The present invention also provides a process for producing an ozone filter comprising impregnating a paper carrier made of inorganic fiber and having a high porosity with a suspension of zeolite powder having an $SiO_2/Al_2O_3$ molar ratio of not smaller than 15 and, after drying, impregnating the impregnated carrier with a suspension of fine powder-like activated manganese dioxide having ozone decomposing capability.

DETAILED DESCRIPTION OF THE INVENTION

Zeolite which is to be supported on a carrier together with a manganese dioxide catalyst has an $SiO_2/Al_2O_3$ molar ratio of 15 or greater, with the preferred upper limit being 100. General zeolite having an $SiO_2/Al_2O_3$ molar ratio of approximately from 2 to 10 exhibits strong hydrophilic properties and is made use of as a desiccant. To the contrary, the zeolite having as high an $SiO_2$ ratio as 15 or greater is known for its capability of adsorbing hydrocarbon compounds rather than steam and is called hydrophobic zeolite. $HAlSi_{35}O_{72}$ and $HAlSi_{25}O_{52}$ are typical examples of hydrophobic zeolite (see JP-W-60-501495, the term "JP-W" as used herein means an "unexamined published international patent application" and JP-A-1-31457). Commercially available hydrophobic zeolite has an $SiO_2/Al_2O_3$ molar ratio of approximately from 50 to 500.

An ozone filter having both hydrophobic zeolite powder and a manganese dioxide catalyst supported on its carrier does not emit a perceptible foul smell even when used for a long time. While the mechanism of action of hydrophobic zeolite has not yet been elucidated, it is considered that the hydrophobic zeolite adsorbs the organic matter in the air either as such or after being oxidized with ozone in the vicinities of the manganese dioxide catalyst, thereby inhibiting release of substances causing a foul smell.

Incorporation of hydrophobic zeolite tends to result in slight reduction of ozone decomposing capability of a manganese dioxide catalyst. This can be compensated for by distributing hydrophobic zeolite at a higher density in the core portion than in the surface portion of a carrier while distributing a manganese dioxide catalyst at a higher density in the surface portion than in the core portion of the carrier, thereby allowing the manganese dioxide catalyst to fully exert its ozone decomposing capability.

It is preferred that the hydrophobic zeolite be used approximately in an amount of 15 to 40 parts by weight per 100 parts by weight of a manganese dioxide catalyst. Too small an amount of hydrophobic zeolite would fail to completely inhibit emission of a foul smell. On the other hand, an excess amount of hydrophobic zeolite results in limitation of the amount of a manganese dioxide catalyst to be supported and hindrance to the ozone decomposing action of the manganese dioxide catalyst.

The ozone filter according to the present invention can be produced as follows.

The selection of manganese dioxide which is suitable as a catalyst for ozone decomposition is not particularly limited, and any commercially available product or one prepared by an arbitrary process may be employed. A particularly recommended catalyst is fine powder-like activated manganese dioxide having a particle size of 0.3 to 50 μm and a specific surface area of not less than 150 m$^2$/g. The upper limit of the specific surface area is preferably 300 m$^2$/g. The specific surface area can be measured by BET method (nitrogen adsorption method). Such fine powder-like manganese dioxide having a large specific surface area can be fixed onto a paper carrier comprising inorganic fiber in a large quantity and uniformly deep into the core portion thereof. The fine powder-like activated manganese dioxide can easily be prepared, for example, by adding an aqueous solution of an oxidizing agent, e.g., a hypochlorite or a permanganate, to an aqueous suspension of manganese carbonate and treating the collected precipitate of manganese dioxide with an acid, followed by neutralization with an alkali (see JP-B-55-8456, the term "JP-B" as used herein means an "examined published Japanese patent application").

It is preferred in the present invention that hydrophobic zeolite has a particle size of approximately from 1 to 10 μm. Too coarse zeolite does not easily enter fine voids among fibers of a carrier so that it tends to be difficult to localize the zeolite in the core portion of a carrier.

The paper carrier made of inorganic fiber and having a high porosity is known, as described, e.g., in JP-A-59-10345. That is, the paper carrier used in the present invention includes paper composed of inorganic fiber, such as alumina fiber, silica alumina fiber, glass fiber or rock wool, and having a high porosity of 70 to 95%; and a honeycomb structure fabricated of this paper. "HONEYCLE", produced by Nichias Corporation, is an example of usable commercially available paper carriers. The terminology "porosity" as used herein means a value calculated according to the following equation.

Porosity (%)=(1−apparent density/true density)×100

While not limiting, a suitable thickness of the paper carrier is approximately from 0.1 to 0.4 mm.

A honeycomb structure of the inorganic fiber paper is most suited to efficiently treat a great amount of air at a low pressure loss and is particularly superior as a carrier for a manganese dioxide catalyst for treating air containing ozone in a low concentration. Further, it can easily be cut into any desired shape and size, and it is not broken when dropped. A preferred honeycomb structure has an effective surface area of 8 to 40 cm$^2$/cm$^3$, particularly 20 to 40 cm$^2$/cm$^3$, and an aperture area rate of 50 to 90%, particularly 50 to 70%.

The fine powder-like activated manganese dioxide and hydrophobic zeolite can be fixed on the above-mentioned carrier by impregnating the carrier with a suspension of activated manganese dioxide and hydrophobic zeolite to which an inorganic binder, such as silica sol, alumina sol, titania sol or a mixture thereof, has been added, followed by drying. The impregnation may be carried out by dipping or coating. The amount of the binder to be used is preferably minimized. If used in excess, the binder covers the surface of manganese dioxide to reduce the catalytic activity. The amount of the inorganic binder (as a solid Content) is generally from 5 to 100 parts by weight per 100 parts by weight of the powder (activated manganese dioxide and hydrophobic zeolite) contained in the suspension. Where it is difficult to fix the requisite amount of the catalyst and hydrophobic zeolite at a time, the impregnation and drying may be repeated until a desired amount is deposited.

A binder-containing suspension of activated manganese dioxide and a binder-containing suspension of hydrophobic zeolite may be prepared separately. In this case, a treatment with one of the suspensions can be followed by a treatment with the other suspension.

In a preferred embodiment of the present invention, hydrophobic zeolite is the first to be fixed on the carrier. Hydrophobic zeolite to be fixed is suspended in water together with an inorganic binder, such as silica sol, alumina sol, titania sol or a mixture thereof. It is preferable to use the binder in a minimum, but sufficient, amount to fix the hydrophobic zeolite on the surface of the fibrous carrier. If used in excess, the binder covers zeolite particles on setting and hinders zeolite from exerting the effect of preventing generation of a foul smell. The amount of the inorganic binder (as a solid content) is generally from 5 to 100 parts by weight per 100 parts by weight of the powder (hydrophobic zeolite) contained in the suspension. After the carrier sufficiently absorbs the hydrophobic zeolite suspension by dipping or coating, the excess zeolite suspension is removed, and the impregnated carrier is dried, whereby the zeolite particles penetrate through the fine voids of the carrier and reach the core portion and are fixed there.

A manganese dioxide catalyst is then fixed on the carrier having supported thereon hydrophobic zeolite. Fixing of a manganese dioxide catalyst on the carrier can be conducted in the safe manner as that employed for the hydrophobic zeolite. Since the number and the size of the voids of the carrier have been reduced due to the previous fixing of hydrophobic zeolite, most of the manganese dioxide catalyst is fixed on the surface portion of the carrier, hardly reaching the core portion. Where it is difficult to fix the requisite amount of the catalyst at a time, the impregnation and drying may be repeated until a desired amount of the catalyst is fixed.

There is thus produced an ozone filter in which zeolite powder is present at a higher density in the core portion than in the surface portion of a carrier, with a manganese dioxide catalyst being present at a higher density in the surface portion than in the core portion.

Part of the voids among fibers of the carrier should remain unoccupied by hydrophobic zeolite and a manganese dioxide catalyst so as to facilitate diffusion of air to be treated to the surface of the zeolite and catalyst particles fixed in the core portion as well as in the surface portion, thereby assuring a high utilization of zeolite and the catalyst. More specifically, it is preferred that a residual porosity of the resulting ozone filter is approximately from 50 to 85% as calculated according to the above-described equation.

The present invention will now be illustrated in greater detail with reference to Examples, but it should be understood that the present invention is not deemed to be limited thereto. Unless otherwise specified, all the parts are given by weight.

EXAMPLE 1

Paper having a thickness of 0.1 mm and a porosity of 90% which comprised silica alumina fibers having a fiber diameter of 2 to 3 μm and a small proportion of an organic binder was corrugated. Corrugated paper and non-corrugated paper were alternately laminated with a silica type adhesive applied to the crests to prepare a honeycomb structure having 560 cells per square inch.

In 2000 ml of water was suspended 1 kg of manganese carbonate obtained by reacting a manganese sulfate aqueous solution and a sodium carbonate aqueous solution and washing and drying the formed precipitate. The suspension was heated to 60° C., and an aqueous solution of sodium hypochlorite was added thereto in small portions while stirring. Whereupon, manganese carbonate reacted while evolving carbonic acid gas and changed to black manganese dioxide. After completion of the reaction, the manganese dioxide precipitate was collected by filtration, washed with water, and dried to give manganese dioxide powder having an average particle size of 5 μm and a specific surface area of 220 m$^2$/g.

A hundred parts of the resulting manganese dioxide powder, 30 parts of hydrophobic zeolite ($SiO_2/Al_2O_3$=150), and 100 parts of silica sol (solid content: 30% by weight) were mixed with 200 parts of water, and the honeycomb structure (dimension: cell aperture plane: 100 mm×100 mm; length in the air-flow direction: 15 mm) was dipped in the resulting slurry and dried. The dipping and drying were repeated once more to obtain an ozone filter having supported thereon 46 g/m$^2$ of manganese dioxide and 14 g/m$^2$ of hydrophobic zeolite and having a residual porosity of 70%.

COMPARATIVE EXAMPLE 1

An ozone filter was prepared in the same manner as in Example 1, except for using no hydrophobic zeolite. The amount of manganese dioxide supported on the carrier was 46 g/m$^2$.

Each of the ozone filters prepared in Example 1 and Comparative Example 1 was tested in accordance with the following test method to examine ozone decomposing capability.

Test Method:

Ozone-containing air prepared by treating dehumidified air by means of an ozonizer (a silent discharge type ozone generator) was diluted with fresh air to an ozone concentration of 0.5 ppm and adjusted to 27° C. and a relative humidity of 80%. The prepared gas was continuously passed through the ozone filter at a space velocity of 280,000 hr$^{-1}$, with the cell aperture plane of the filter being perpendicular to the direction of the air flow. After a prescribed period of time, the air having passed through the filter was sampled to measure an ozone concentration, and a rate of ozone decomposition was calculated according to the following equation.

Ozone decomposition rate (%)=(Ozone concentration at the inlet– Ozone concentration at the outlet)×100/Ozone concentration at the inlet The results obtained are shown in Table 1. It is seen that the ozone decomposing capability of the filter of Example 1, which contains hydrophobic zeolite, is sufficient for practical use, though slightly less than that of the comparative filter.

TABLE 1

| Treating Time (hr) | Ozone Decomposition Rate (%) | |
| --- | --- | --- |
| | Example 1 | Comparative Example 1 |
| 1 | 90 | 95 |
| 15 | 84 | 93 |

Further, each ozone filter was set in an electrostatic copying machine and tested for its performance in continuous copying. As a result, the comparative ozone filter gave off a foul smell after making 100,000 copies, whereas no foul smell was detected from the filter of Example 1 even after making 180,000 copies.

EXAMPLE 2

Twenty parts of hydrophobic zeolite having an $SiO_2/Al_2O_3$ molar ratio of 150 and an average particle size of 5 μm were mixed with 100 parts of silica sol (solid content: 30% by weight) and 80 parts of water to prepare a slurry. The same honeycomb structure as used in Example 1 was dipped in the resulting zeolite slurry. After removing the excess slurry, the impregnated carrier was dried.

A hundred parts of a manganese dioxide catalyst prepared in the same manner as in Example 1 (average particle size: 5 μm; specific surface area: 220 m$^2$/g) were mixed with 80 parts of silica sol (solid content: 30% by weight) and 280 parts of water to prepare a slurry, and the above-obtained carrier having supported thereon zeolite was dipped in the slurry and dried. The dipping in the manganese dioxide slurry and drying were repeated once more to obtain an ozone filter having supported thereon 46 g/m$^2$ of manganese dioxide and 14 g/m$^2$ of hydrophobic zeolite and having a residual porosity of 70%.

Observation of the surface of the resulting ozone filter under an electron microscope revealed that the surface of the carrier was densely covered with the manganese dioxide catalyst with substantially no zeolite particle appearing.

COMPARATIVE EXAMPLE 2

An ozone filter was prepared in the same manner as in Example 2, except that the impregnation with the hydrophobic zeolite slurry was not conducted. The amount of the manganese dioxide catalyst supported was 46 g/m$^2$.

REFERENCE EXAMPLE

The same honeycomb structure as used in Example 1 was dipped in a slurry prepared by mixing 100 parts of manganese dioxide powder, 30 parts of hydrophobic zeolite, 100 parts of silica sol (each of which was the same as the one used in Example 2), and 200 parts of water and dried. The dipping and drying were repeated once more to obtain an ozone filter having supported thereon 46 g/m$^2$ of manganese dioxide and 14 g/m$^2$ of hydrophobic zeolite and having a residual porosity of 70%.

Observation of the surface of the resulting ozone filter under an electron microscope revealed that the manganese dioxide catalyst and the hydrophobic zeolite were present on the surface of the carrier at a ratio approximate to the above-described manganese dioxide to hydrophobic zeolite ratio.

Each of the ozone filters prepared was tested to obtain an ozone decomposition rate in the same manner as described in Example 1. The results obtained are shown in Table 2.

TABLE 2

| Treating Time (hr) | Ozone Decomposition Rate (%) | | |
|---|---|---|---|
| | Example 2 | Comparative Example 2 | Reference Example |
| 1 | 95 | 95 | 90 |
| 15 | 93 | 93 | 84 |

Further, each ozone filter was set in an electrostatic copying machine and tested for its performance in continuous copying. As a result, the ozone filter of Comparative Example 2 gave off a foul smell after making 100,000 copies, whereas the filters of Example 1 and Reference Example had no foul smell even after making 180,000 copies.

As described above, the ozone filter according to the present invention is free from a foul smell even when used for a long period of time and is therefore capable of maintaining a satisfactory working environment surrounding ozone-generating equipment.

While the invention has been described in detail and with reference to specific examples thereof, it will be apparent to one skilled in the art that various changes and modifications can be made therein without departing from the spirit and scope thereof.

What is claimed is:

1. An ozone filter comprising a paper carrier made of inorganic fiber and having a honeycomb structure with a porosity, said carrier supporting zeolite powder having an $SiO_2/Al_2O_3$ molar ratio of not smaller than 15 and activated manganese dioxide having ozone decomposing capability, said zeolite powder being present at a higher density in a core portion than in a surface portion of said carrier, and said manganese dioxide being present at a higher density in said surface portion than in said core portion of said carrier.

2. An ozone filter according to claim 1, wherein said zeolite powder is present in an amount of 15 to 40 parts by weight per 100 parts by weight of said manganese dioxide.

3. An ozone filter according to claim 1, wherein said $SiO_2/Al_2O_3$ molar ratio of said zeolite powder is from 50 to 500.

4. An ozone filter according to claim 1, wherein said porosity of said paper carrier is between 70 and 95%.

5. An ozone filter according to claim 1, wherein said activated manganese dioxide has a particle size of 0.3 to 50 μm.

6. A process for producing an ozone filter comprising the steps of:

providing a paper carrier made of inorganic fiber and having a honeycomb structure with a porosity;

impregnating said paper carrier with a suspension of zeolite powder having an $SiO_2/Al_2O_3$ molar ratio of not smaller than 15 to form an impregnated carrier; and after drying, impregnating said impregnated carrier with a suspension of activated manganese dioxide having ozone decomposing capability.

7. A process according to claim 6, wherein said paper carrier has a porosity of 70 to 95%, and said zeolite powder has an average particle size of 0.5 to 30 μm.

8. A process according to claim 6, wherein said $SiO_2/Al_2O_3$ molar ratio of said zeolite powder is from 50 to 500.

9. A process according to claim 6, wherein said porosity of said paper carrier is between 70 and 95%.

10. A process according to claim 6, wherein said activated manganese dioxide has a particle size of 0.3 to 50 μm.

* * * * *